2,474,007

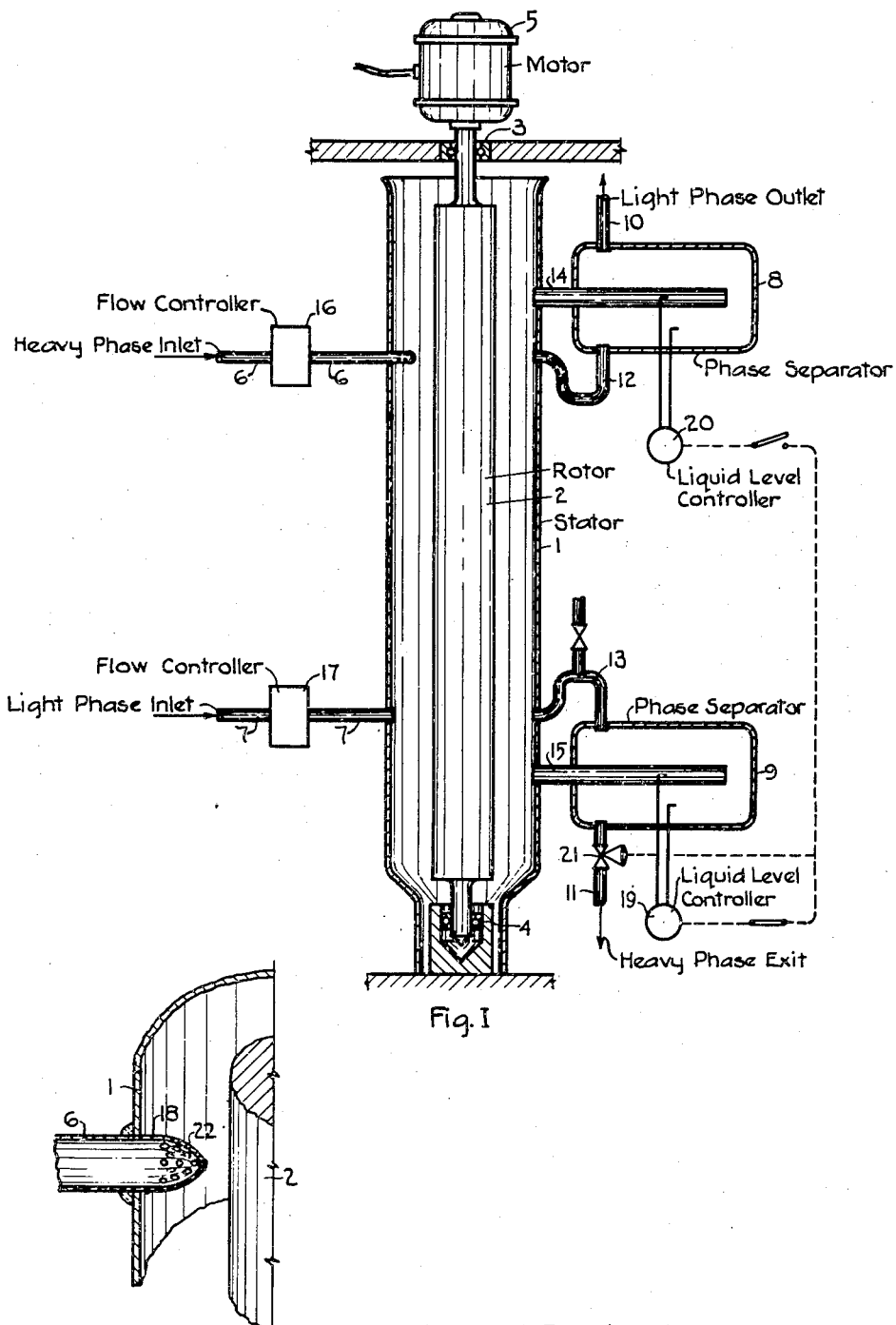
June 21, 1949.  R. L. MAYCOCK  2,474,007
METHOD OF AND APPARATUS FOR CONTACTING FLUIDS
Filed June 21, 1945  2 Sheets-Sheet 1
Fig. I
Fig. Ia
Inventor: Russel L. Maycock
By his Attorney: Hugh A. Kirk June 21, 1949.  R. L. MAYCOCK  2,474,007
METHOD OF AND APPARATUS FOR CONTACTING FLUIDS
Filed June 21, 1945  2 Sheets-Sheet 2
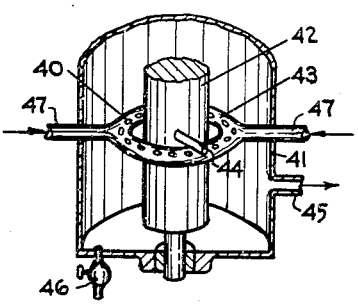
Fig. IIb
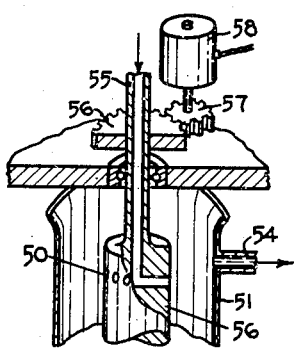
Fig. IIc
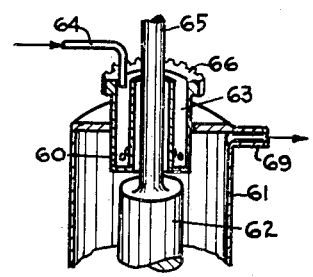
Fig. IId
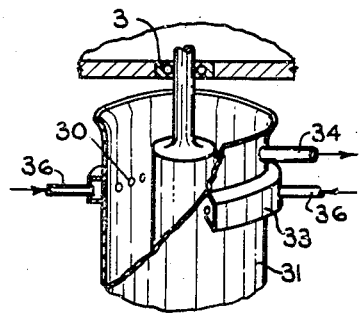
Fig. IIa
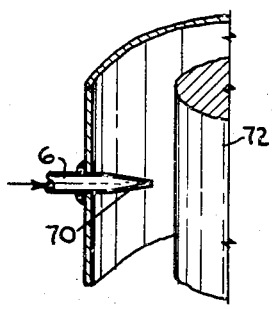
Fig. IIIa
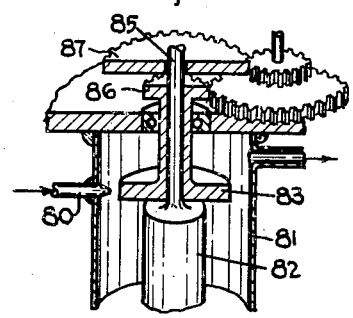
Fig. IIIb
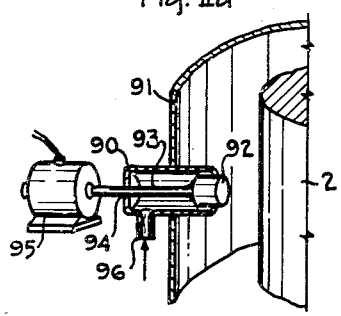
Fig. IVa
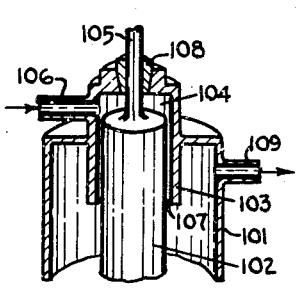
Fig. IVb
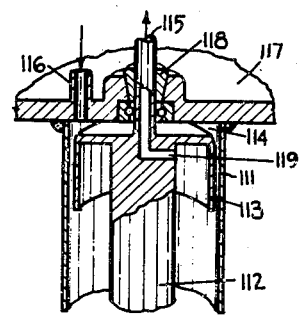
Fig. IVc
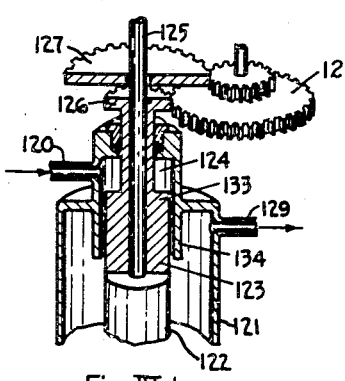
Fig. IVd
Inventor: Russel L. Maycock
By his Attorney: Hugh A. Kirk Patented June 21, 1949

UNITED STATES PATENT OFFICE 2,474,007

METHOD OF AND APPARATUS FOR CONTACTING FLUIDS

Russel L. Maycock, Oakland, Calif., assignor to Shell Development Company, San Francisco, Calif., a corporation of Delaware Application June 21, 1945, Serial No. 600,796

21 Claims. (Cl. 261—83)

1

This invention relates to an improvement in the method of contacting, in a rotary contactor apparatus, two fluid substances which form a heterogeneous mixture. More particularly, it deals with the step of dispersing one fluid phase in another continuous fluid phase before the two phases are contacted in the contact zone of the apparatus. It also deals with the means for carrying out the dispersion operation.

The two fluid substances which are to be contacted in the rotary contacting apparatus must form at least two phases, either or both of which may be a mixture of two or more substances. The two phases may be either two liquid phases or a liquid phase and a gas phase such as is formed by contacting a fluid with a fluid contacting agent. Fluid contacting agents include various reactants such as acid reacting substances, basic reacting substances, salts, reducing agents, oxidizing agents, halogenating agents, solutizing agents, neutral or reactive absorbents, and other agents used in processes for reacting, treating, refining, separating, extracting, purifying, concentrating, etc., fluids or fluid mixtures.

The rotary contactor apparatus comprises an annular contact zone formed between two elongated structures having surfaces of revolution, one inside the other, but out of contact with each other, wherein at least one of said surfaces rotates about its axis of revolution relative to that of the other surface. One form of such a contactor comprises two concentric cylinders, wherein the inner cylinder is rotated and the outer cylinder is stationary (see Figure I). Normally in the rotary contacting apparatus, one of the two phases is dispersed in another continuous phase by the shearing forces developed in the fluid mixture through the relative rotation of one surface to that of the other surface of the annular contact zone. The relative angular velocity between the surfaces should be sufficient to cause an orderly distribution of the dispersed phase in the continuous phase, but insufficient to cause random turbulence. The particles of the dispersed phase that are produced have a limited range of size distribution.

It is a purpose of this invention to increase the efficiency, economy, flexibility and operability of the rotary contactor described. Another purpose is to produce smaller-sized particles of dispersed phase than would normally be produced by the relative rotation of the surfaces of the contact zone. Another purpose is to increase the number of theoretical contact stages in a

2 given rotary contactor without increasing the relative angular velocity of the surfaces of the contact zone. Still another purpose is to be able to obtain high efficiencies with lower relative angular velocities between the surfaces of the contact zone. Still further purposes will appear as the description proceeds.

Generally speaking, this invention comprises dispersing the phase to be dispersed in a rotary contactor independent of the shearing forces in the annular contact zone and before or as it enters the contact zone, such as by injecting this phase at or into the zone through a suitable dispersing means, of which there are several types:

Figure I is a vertical partial section of one embodiment of a rotary contactor apparatus; Figure Ia is an enlarged section of the dispersing means for the heavy phase inlet port of Figure I; Figures IIa, IIb, IIc and IId are partial sections of various spray-type dispersing means; Figures IIIa, IIIb are partial sections of various spray-type impinging dispersing means; Figures IVa, IVb, IVc and IVd are partial sections of various shearing-type dispersing means. Similar elements in the different figures are numbered similarly.

For the purpose of illustration, the rotary contactor in Figure I will now be described when operating as a liquid-liquid solvent extractor wherein a liquid mixture to be separated is the lighter and continuous phase and flows through the annular cylindrical zone countercurrently to a solvent which is the heavier and dispersed phase. The rotary contactor comprises, in this case, a stationary outer housing having a cylindrical surface 1, called the "stator" and a rotating inner core having a cylindrical surface 2, called the "rotor." The rotor is mounted at each end in bearings 3 and 4 and rotated by a variable speed motor 5. Above and below the heavy phase and light phase inlets 6 and 7, respectively, are quiescent zones, which are shown here to be settlers 8 and 9, from which the light phase and heavy phase products are separately withdrawn through lines 10 and 11, respectively. Each settler is provided with a return or recycle line 12 or 13 and with inlet lines 14 and 15.

The light phase introduced through conduit or line 7 passes through a flow controller 17 and then into and up through the annular zone between stator 1 and rotor 2 and is withdrawn through lines 14 and 10 from settler 8. The heavy phase, introduced through conduit or line 6, passes through flow controller 16, through dispersing means 18 and then as small droplets into and down through the annular zone and is withdrawn through line 15 together with some of the continuous phase into settler 9 wherein the droplets are coalesced and then withdrawn as a separate phase through line 11. Separated light continuous phase in settler 9 is returned to the contact zone through line 13. Similarly, carryover of the dispersed phase into settler 8 is returned through line 12. The interface level between the two phases is maintained in settler 9 by suitable positive level control means, such as a float or an electric controller 19, which operates the valve 21 for the withdrawal of the heavy phase through line 11. The location of the interface may be either in the top or bottom settler, depending upon whether the lighter or the heavier of the two phases is the dispersed phase, since the dispersed phase always travels toward the interface level.

Many modifications of the rotary contactor apparatus are possible without departing from the scope of this invention. For example, the surface of the contact zone may be stepped, curved and/or tapered and either one or both of the surfaces may be rotated in the same or opposite direction, provided there is a sufficient relative angular velocity between these surfaces to maintain the dispersed phase distributed in an orderly fashion in the continuous phase. The stator chamber may be closed at the top and the apparatus may be operated under atmospheric or higher pressures. Other inlet and outlet lines may be placed at different points along the rotary contact zone for control or removal of part of the fluid mixture as it passes through the contact zone. The fluids may be passed either concurrently or countercurrently through the zone. The apparatus may be jacketed to control and maintain any desired temperature. The rotor 5 may be mounted to drive either end or both ends of the rotor either directly or indirectly. If the rotor is relatively long in comparison to its diameter it may be steadied by bearings between its ends.

Figure Ia, which is an enlargement of the dispersing means 18 in Figure I, shows a tube provided with a closed end at which are a plurality of openings 22 through which fine streams of the phase-to-be-dispersed are passed into the moving continuous phase in the contact zone and are thereby broken up into small droplets having sizes related to the size of the openings 22.

Figure IIa shows a ring of holes 30 circularly spaced in and around the stator 31, which are connected through the hollow annular ring 33 to the inlet ports 36. The stator contains an outlet port 34 above the ring 33.

Figure IIb shows a dispersing means at the bottom of the contactor column comprising a stator 41, rotor 42 provided with outlet port 45, drain valve 46, and inlet ports 47 extending inwardly and connected to an annular hollow spray ring 43 located about half way between the stator and the rotor and containing a ring of holes 40. There may also be provided on the rotor 42 one or more wiping arms 44 to scrape the droplets from the holes 40 in the top of the ring 43 as the rotor rotates.

In Figure IIc the phase-to-be-dispersed is introduced into the end of the hollow rotor shaft 55 of rotor 52 and then passes out through holes 50 that communicate with the hollow portion of the rotor shaft 55. The phase-to-be-dispersed is thus sprayed into the contact zone between the rotor 52 and stator 51 as the rotor is rotated. Means including gears 56 and 57 driven from a power source such as a motor 58 are provided for rotating the rotor 52.

Figure IId discloses a dispersing means having a ring of openings 60 located in the bottom of an annular trough 63 which fits around the axle 65 of the rotor 62 and is rotated by means of gear 66 at an angular velocity preferably greater than that of the rotor 62. The phase-to-be-dispersed is introduced through line 64 which empties into the trough 63 and is sprayed through the holes 60 into the continuous phase which fills the annular contact zone between the rotor 62 and the stator 61. The stator 61 has an outlet port 69 near its top above the level of the ring of holes 60.

In the types of spray dispersing means shown in Figures IIa, IIc and IId the holes can be arranged axially to form a helix so that the droplets coming from one hole will not be so likely to contact the droplets from the next adjacent hole and coalesce into larger droplets. The smaller droplets are to be preferred because of the increased area available for contacting, provided the droplets are not so small as to cause emulsification or foaming in the apparatus. Increased contact area in turn increases the number of theoretical contact stages in a given apparatus.

In Figure IIIa the jet 70 is connected to the inlet port 6 and extends across the annular space from the stator 71 to within a short distance of the rotor 72 upon which the phase-to-be-dispersed may impinge. The rotation of the rotor 72 aids in the formation of small uniformly sized droplets and reduces the tendency of the droplets to coalesce. There may be provided flexible projections around and on the rotor 72 adjacent the jet 70 to aid in the removal of droplets from the end of jet 70.

Figure IIIb discloses a separate impinging disc 83 which is fitted over the shaft 85 of the rotor 82. Both the disc 83 and the rotor 82 may be driven at the same speed or they may be driven at different speeds through the gears 86 and 87. The surface of the disc 83 is shown to be projected beyond the surface of rotor 82 and close to the inlet port jet 80 projecting through the side of the stator 81 toward the disc 83. The greater the peripheral velocity of the surface of the disc 83, the smaller are the droplets produced.

Figure IVa shows a shearing-type dispersing means which comprises a cylindrical housing 90 projecting perpendicular to and beyond both sides of the wall of the stator 91 with the open end in the annular contact zone. A rotating drum 92 is located partly inside and partly projecting beyond the open end of the housing 90. Drum 92 is rotated by means of a shaft 93 extending along the axis of said housing and through bearing 94, at the other end of the housing, to a power source 95. The inlet port 96 for the phase-to-be-dispersed connects with that portion of the housing extending outside the stator 91 so that this phase passes through the housing around the shaft 93 and between the drum 92 and the inner surface of the housing extending into the contact zone. The shearing force between the surface of the drum 93 and the inner surface of the open end of the housing tears the phase-to-be-dispersed into droplets as it enters the contact zone.

Figure IVb shows a dispersing means wherein the end of the rotor 102 itself is one of the surfaces of the dispersing means. The other surface of the dispersing means is a sleeve 103 projecting from the end of the stator 101 and fitting around the end of the rotor 102. The phase to be dispersed passes through port 106 into a chamber 104 provided above the rotor 102 and as an extension of the sleeve 103. From this chamber this phase passes between the sleeve 103 and upper end of the rotor 102 where it is sheared into droplets as it enters the annular contact zone from the lower end of the sleeve at 107. The shaft 105 on the end of the rotor 102 is mounted in a suitable packed bearing 108 to prevent leakage of the phase-to-be-dispersed from the chamber 104. The stator 101 is provided with an outlet port 109 located above the edge 107 of the sleeve 103 so that little of the dispersed phase will pass out through 109 as carryover with the continuous phase.

Figure IVc discloses a dispersing means similar to that shown in Figure IVb but differing in the feature that the shearing surfaces are formed by the outer surface of the cup shaped flange 113 on the rotor 112, and the inner surface of the stator 111. The phase-to-be-dispersed is introduced at the top end of the rotor through port 116 into a small chamber 114 bounded by the upper end of the stator 111, the base of the cup, the flange 113, and the end plate 117. A suitable packed bearing 118 is provided for the shaft 115 of rotor 112. The outlet port 119 for the continuous phase at the top of the annular zone is located in the rotor 112 and communicates with the hollow interior of the shaft 115 of the rotor. This allows little, if any, of the dispersed phase to be carried over through line 119 with the continuous phase.

Figure IVd shows a further modification of the shearing-type dispersing means incorporating both the features of Figures IIIb and IVb. In Figure IVd drum 133 is provided around the shaft 125 of the rotor 123, which drum is rotated at an angular velocity different from and in general greater than that of rotor 123 through gears 126 and 127. The inlet port 120 for the phase to be dispersed connects with a chamber 124 around the shaft of the drum 123 and connects through the shearing space with the top of the annular contact zone. The shearing surfaces are the cylindrical surface of the drum 123 and the inner cylindrical surface of the flange 134 of the stator 121. The continuous phase is withdrawn through the outlet port 129 above that place where the dispersed phase enters the contact zone.

The apparatus, including the dispersing means, may be constructed of any suitable material which will withstand the strain of the rotational and other forces present during their operation and not react with the heterogeneous fluids being contacted therein. Some suitable materials are various steels including stainless steel, nickel, brass, monel metal, aluminum, magnesium, glass, earthenware, plastic, wood, etc., depending on the nature of the fluids contacted and the temperatures and pressures employed.

EXAMPLE I

Several different solutions of acetic acid (HAc) in methyl isobutyl ketone (MIBK) were countercurrently contacted with water in a rotary contactor of the type shown in Figure I having a stator diameter of 3.75 inches, a rotor diameter of 2.31 inches, and a length of 41 inches. Ratio of methyl isobutyl ketone to water fed to the column in each run was 1.5 by volume. The moles of acetic acid per liter extracted by the water were determined and the efficiency of the contactor as the number of theoretical extraction stages per foot were calculated for each run made by the method disclosed in the article by Hunter and Nash in the Journal of the Society of Chemical Industry, vol. 51, page 285T (1932). The methyl isobutyl ketone was the continuous phase in the contactor and the aqueous phase was distributed in an orderly fashion in it during the contact. The following Table A shows the conditions employed and the results obtained for each run:

Table A

| Run No. | Total Throughput | R. P. M. of Rotor | Efficiency stages/ft. |
|---|---|---|---|
| 1 | 2,600 | 450 | 1.29 |
| 2 | 1,800 | 600 | 1.87 |
| 3 | 2,600 | 450 | 1.57 |
| 4 | 1,800 | 600 | 2.40 |

Runs 1 and 3 were made at one throughput and rotor speed and runs 2 and 4 were made at another throughput and rotor speed, as may be seen in the above table. In runs 3 and 4 the aqueous phase was introduced into the contact zone through a spray jet of the type shown in Figure Ia containing 31 holes, each of which was .0135 inch in diameter. In runs 1 and 2 the aqueous phase was introduced directly into the contact zone without passing through any sort of a dispersing means. A comparison of runs 1 and 3 and runs 2 and 4 shows that the efficiency of the contactor is materially increased by predispersing the dispersed phase.

EXAMPLE II

Several solutions of benzene and acetone having different concentrations were countercurrently contacted with water in the same column as employed in Example I above. The benzene-acetone phase was the continuous phase and the water was the dispersed phase. The feed rates of both the water and the benzene acetone solutions were 1000 cc. per minute each. The moles of acetone per liter in the raffinate were determined and a number of stages in the column were calculated for each of the runs as above. The data for these runs are shown in Table B below:

Table B

| Run No. | R. P. M. of Rotor | No. of Stages |
|---|---|---|
| 1 | 400 | 1.6 |
| 2 | 600 | 3.0 |
| 3 | 400 | 3.5 |
| 4 | 600 | 4.2 |
| 5 | 400 | 3.4 |

Runs 1 and 2 were made without employing any dispersing means in the water feed port. In runs 3 and 4 dispersing means of the type shown in Figure Ia were employed for the aqueous phase having 12 holes, each .031 inch in diameter; and in run 5 a different dispersing means of the type shown in Figure Ia having only 8 holes of the same diameter was employed. A comparison of the above data shows that a predispersing means materially increases the number of stages of contact in the column for the same total throughput and solvent to feed ratio.

The invention claimed is:

1. A method of contacting a plurality of fluid substances forming a heterogeneous mixture when in contact, at least one substance being a liquid, comprising the steps of subdividing one of said substances into small particles, thereafter dispersing the resulting particles in another of said substances, effecting contact between the dispersed particles and the said other substance by flowing the dispersed particles through an elongated annular contact zone bounded by surfaces of revolution and formed between a housing and a core within said housing, and maintaining said particles in a subdivided state and dispersed in said other substance while flowing through said contact zone by developing shearing forces in the fluid mixture in said annular contact zone, said shearing forces being developed by providing rapid rotational movement between said housing and core.

2. The method according to claim 1, wherein the substance is subdivided by being discharged in a plurality of streams into the said annular contact zone.

3. The method according to claim 1, wherein the substance is subdivided by being discharged through a stationary orifice against a rapidly rotating surface within the contact zone.

4. The method according to claim 1 wherein the substance is subdivided by flow between two relatively revolving structures having surfaces of revolution which impose a shear upon said substance, thereby breaking it up into small particles.

5. A method of contacting two or more fluid substances which form at least two phases when in contact with each other, at least one of which phases is a liquid, in an elongated annular contact zone formed between two structures comprising a housing and a core within the housing, said structures being relatively rotatable and having surfaces of revolution, comprising the steps of introducing one of said substances into said annular contact zone to form a continuous phase therein, first subdividing another of said substances into small particles and then dispersing the resulting particles in said continuous phase to form a dispersed phase therein, rotating at least one of said structures relatively to the other to develop shearing forces in the resulting dispersion within said annular contact zone and maintain the dispersed phase subdivided and dispersed in the continuous phase, and flowing the dispersed phase through said elongated contact zone to effect intimate contact between the continuous and dispersed phases.

6. The method according to claim 5 wherein the substance forming the continuous phase is introduced near one end of the elongated contact zone, the subdivided particles of the other substance are dispersed in the continuous phase near the other end of the elongated contact zone, and the dispersed phase and continuous phase flow through the elongated contact zone counter-currently to each other.

7. The method according to claim 2, wherein the said resulting subdivided particles are of a relatively smaller size than those obtainable by merely subjecting a mixture of said phases to the shearing forces developed in the annular contact zone at the same relative velocity between the said structures.

8. The method of claim 5, wherein two phases are liquid.

9. The method of claim 5, wherein one of said phases is a gas.

10. A method of contacting two or more fluid substances which form at least two phases when in contact with each other, at least one of which phases is a liquid, comprising the steps of subdividing one of said substances into small particles by means independent of the shearing forces in the annular contact zone, described below, dispersing the resulting particles in another and continuous phase, and passing the commingled phases through a substantially uninterrupted elongated annular contact zone formed between elongated structures having surfaces or revolution, one inside the other and out of contact with each other while rotating at least one of said structures about its axis at a different angular velocity from that of the other surface to develop shearing forces in the commingled phases flowing through the elongated contact zone and thereby maintain the dispersed phase dispersed within the continuous phase.

11. A rotary contactor apparatus for contacting fluid substances forming a heterogeneous mixture when in contact, comprising in combination, an elongated housing having an interior surface of revolution, an elongated core within said housing having an external surface of revolution, said surfaces being out of contact and providing between them an elongated, annular contact zone, adapted to develop shearing forces on a dispersion of said fluid substances upon relative rotation of housing and core, said housing and core being mounted for relative rotation about a longitudinal axis, means for imparting relative rotation to said housing and core to attain a differential angular velocity between said surfaces for developing shearing forces on a dispersion of said fluid substances when flowed through said annular contact zone and thereby maintain the dispersed substance dispersed in the other substance, first conduit means for introducing a first fluid substance into said contact zone, second conduit means for introducing a second fluid substance into said contact zone, fluid dispersing means in said second conduit for subdividing said second fluid substance into small particles, and discharge means at a point axially spaced from said second conduit means for discharging said second fluid substance after flow through said elongated contact zone.

12. The apparatus of claim 11, wherein the dispersing means comprises a nozzle projecting into said annular contact zone.

13. The apparatus of claim 11, wherein said dispersing means is a spray ring coaxial with said annular contact zone and containing a series of openings which are in communication with said annular contact zone.

14. The apparatus of claim 11, wherein the dispersing means comprises two auxiliary, relatively revolvable structures providing an annular shearing space between them and connected to said second conduit means for flow of said second fluid substance through said shearing space before entering the elongated annular contact zone.

15. A rotary contactor apparatus for contacting fluid substances forming a heterogeneous mixture when in contact, comprising, in combination, an elongated housing having a cylindrical interior surface, an elongated core having a cylindrical outer surface and rotatably mounted within and out of contact with said housing to form an elongated, substantially uninterrupted annular contact zone between said surfaces adapted to develop shearing forces on a dispersion of said fluid substances upon relative rotation of the housing and core, means for rotating the core rapidly about its axis to attain a differential angular velocity between said surfaces for developing shearing forces on a dispersion of said fluid substances when flowed through said annular contact zone and thereby maintain the dispersed substance dispersed in the other substance, first inlet and discharge means at axially spaced points for introducing and discharging a first fluid substance into and from said contact zone, a second inlet for introducing a second fluid substance into the contact zone, means at said second inlet for finely subdividing said second fluid substance during flow into the contact zone, and second discharge means at a point axially spaced from the second inlet for discharging said second fluid substance after flow through said contact zone.

16. The apparatus according to claim 15 wherein the means for subdividing the second fluid substance comprises a nozzle extending through the housing into the annular contact zone provided with a plurality of small openings.

17. The apparatus according to claim 15 wherein the means for subdividing the second fluid substance comprises two auxiliary, relatively revolvable structures providing a narrow flow space between them for the flow of said second fluid substance, whereby shearing forces will be applied by the surfaces of said structures on the second fluid for subdividing it.

18. The apparatus according to claim 15, wherein the means for subdividing the second fluid substance comprises a hollow rotor at one end of the housing provided with a plurality of small openings through which the second fluid may be injected into the annular contact zone, and means for rotating the auxiliary rotor.

19. The apparatus according to claim 18, wherein the hollow rotor is an auxiliary rotor and the means for rotating the auxiliary rotor is arranged to rotate auxiliary rotor at an angular velocity different from that at which the core is rotated.

20. The apparatus according to claim 15, wherein the means for subdividing the second fluid substance comprises a cylindrical rotor within the contact zone, means for rotating said rotor, and a nozzle for said second fluid substance directed toward said cylindrical rotor, whereby said second substance will be subdivided by impinging against the rotating cylindrical rotor.

21. The apparatus according to claim 20 wherein the cylindrical rotor is mounted on the core.

RUSSEL L. MAYCOCK.

REFERENCES CITED

The following references are of record in the file of this patent:

UNITED STATES PATENTS

| Number | Name | Date |
| --- | --- | --- |
| 306,040 | Windhausen | Sept. 30, 1884 |
| 1,081,241 | Lymn | Dec. 9, 1913 |
| 1,374,499 | Greenawalt | Apr. 12, 1921 |
| 1,949,696 | Schonebarn | Mar. 6, 1934 |
| 2,054,529 | Gutzeit | Sept. 15, 1936 |
| 2,092,249 | Gymnaites | Sept. 7, 1937 |
| 2,151,126 | Lockey | Mar. 21, 1939 |
| 2,244,902 | Stich | June 10, 1941 |
| 2,308,751 | Guthrie et al. | Jan. 19, 1943 |

FOREIGN PATENTS

| Number | Country | Date |
| --- | --- | --- |
| 16,726 | Great Britain | Sept. 19, 1892 |